United States Patent
Huang et al.

(10) Patent No.: US 10,404,635 B2
(45) Date of Patent: Sep. 3, 2019

(54) OPTIMIZING DATA REPLICATION ACROSS MULTIPLE DATA CENTERS

(71) Applicant: Bank of America Corporation, Charlotte, NC (US)

(72) Inventors: Tao Huang, Bellevue, WA (US);
Archie Agrawal, Seattle, WA (US);
Akshay Jain, Bellevue, WA (US);
Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 15/464,885

(22) Filed: Mar. 21, 2017

(65) Prior Publication Data
US 2018/0278610 A1    Sep. 27, 2018

(51) Int. Cl.
*G06F 21/62* (2013.01)
*H04L 12/58* (2006.01)
*H04L 29/08* (2006.01)

(52) U.S. Cl.
CPC ........ *H04L 51/046* (2013.01); *H04L 67/1095* (2013.01)

(58) Field of Classification Search
CPC ................ H04L 63/08; G06F 21/6218; H04M 2203/6081; H04W 12/06
See application file for complete search history.

(56) References Cited

U.S. PATENT DOCUMENTS

| | | | | |
|---|---|---|---|---|
| 7,373,524 B2* | 5/2008 | Motsinger | ........... | H04L 63/0876 713/188 |
| 8,578,393 B1* | 11/2013 | Fisher | ................. | G06F 11/3476 709/200 |
| 9,953,326 B2* | 4/2018 | Plymouth | .............. | G06Q 20/42 |
| 10,110,618 B1* | 10/2018 | Mao | .................... | H04L 63/1416 |

(Continued)

OTHER PUBLICATIONS

"Apache Spark," from Wikipedia, the free encyclopedia, accessed Mar. 20, 2017, from https://en.wikipedia.org/wiki/Apache_Spark, 6 pages.

(Continued)

*Primary Examiner* — Ali S Abyaneh
(74) *Attorney, Agent, or Firm* — Banner & Witcoff, Ltd.; Michael A. Springs (57) ABSTRACT

Aspects of the disclosure relate to optimizing data replication across multiple data centers. A computing platform may receive, from an authentication hub computing platform, an event message corresponding to an event associated with the authentication hub computing platform. In response to receiving the event message, the computing platform may transform the event message to produce multiple transformed messages. The multiple transformed messages may include a first transformed message associated with a first topic and a second transformed message associated with a second topic different from the first topic. Subsequently, the computing platform may send, to at least one messaging service computing platform associated with at least one other data center different from a data center associated with (Continued)

the computing platform, the multiple transformed messages. In some instances, the event message may include information identifying a user account login event that occurred at the authentication hub computing platform.

17 Claims, 7 Drawing Sheets

(56) References Cited

U.S. PATENT DOCUMENTS

| | | | |
|---|---|---|---|
| 2013/0282462 A1* | 10/2013 | Xu | G06Q 30/0238 705/14.26 |
| 2014/0180905 A1 | 6/2014 | Parsons et al. | |
| 2014/0181133 A1 | 6/2014 | Parsons et al. | |
| 2017/0051076 A1 | 2/2017 | Greene et al. | |
| 2017/0051281 A1 | 2/2017 | Abate-Shen et al. | |
| 2017/0051303 A1 | 2/2017 | Karchi et al. | |
| 2017/0051308 A1 | 2/2017 | Morgan et al. | |
| 2017/0051351 A1 | 2/2017 | Hakonarson et al. | |
| 2017/0052170 A1 | 2/2017 | Shekdar et al. | |
| 2017/0052520 A1 | 2/2017 | Petrocy et al. | |
| 2017/0053033 A1 | 2/2017 | Wookey | |
| 2017/0053091 A1 | 2/2017 | Holmes et al. | |
| 2017/0053244 A1 | 2/2017 | Khalil | |
| 2017/0053398 A1 | 2/2017 | Mahoor et al. | |
| 2017/0053468 A1 | 2/2017 | Johnson | |
| 2017/0054480 A1 | 2/2017 | Shattil | |
| 2017/0054716 A1 | 2/2017 | Egorov et al. | |
| 2017/0054760 A1 | 2/2017 | Barton et al. | |
| 2017/0054802 A1 | 2/2017 | Annamalai et al. | |
| 2017/0058030 A1 | 3/2017 | Georgiou et al. | |
| 2017/0058048 A1 | 3/2017 | Greene et al. | |
| 2017/0058295 A1 | 3/2017 | Bidney et al. | |
| 2017/0058349 A1 | 3/2017 | Levy et al. | |
| 2017/0058360 A1 | 3/2017 | Theodorescu et al. | |
| 2017/0060574 A1 | 3/2017 | Malladi et al. | |
| 2017/0060711 A1 | 3/2017 | Davis et al. | |
| 2017/0061034 A1 | 3/2017 | Ritchey et al. | |
| 2017/0063634 A1 | 3/2017 | Norige et al. | |
| 2017/0063886 A1 | 3/2017 | Muddu et al. | |
| 2017/0063887 A1 | 3/2017 | Muddu et al. | |
| 2017/0063888 A1 | 3/2017 | Muddu et al. | |
| 2017/0063889 A1 | 3/2017 | Muddu et al. | |
| 2017/0063890 A1 | 3/2017 | Muddu et al. | |
| 2017/0063891 A1 | 3/2017 | Muddu et al. | |
| 2017/0063894 A1 | 3/2017 | Muddu et al. | |
| 2017/0063896 A1 | 3/2017 | Muddu et al. | |
| 2017/0063897 A1 | 3/2017 | Muddu et al. | |
| 2017/0063898 A1 | 3/2017 | Muddu et al. | |
| 2017/0063899 A1 | 3/2017 | Muddu et al. | |
| 2017/0063900 A1 | 3/2017 | Muddu et al. | |
| 2017/0063901 A1 | 3/2017 | Muddu et al. | |
| 2017/0063902 A1 | 3/2017 | Muddu et al. | |
| 2017/0063903 A1 | 3/2017 | Muddu et al. | |
| 2017/0063904 A1 | 3/2017 | Muddu et al. | |
| 2017/0063905 A1 | 3/2017 | Muddu et al. | |
| 2017/0063906 A1 | 3/2017 | Muddu et al. | |
| 2017/0063907 A1 | 3/2017 | Muddu et al. | |
| 2017/0063908 A1 | 3/2017 | Muddu et al. | |
| 2017/0063909 A1 | 3/2017 | Muddu et al. | |
| 2017/0063910 A1 | 3/2017 | Muddu et al. | |
| 2017/0063911 A1 | 3/2017 | Muddu et al. | |
| 2017/0063912 A1 | 3/2017 | Muddu et al. | |
| 2017/0063964 A1 | 3/2017 | Maltbie et al. | |
| 2017/0272306 A1* | 9/2017 | Venkataraman | H04L 41/065 |

OTHER PUBLICATIONS

"Apache Cassandra," from Wikipedia, the free encyclopedia, accessed Mar. 20, 2017, from https://en.wikipedia.org/wiki/Apache_Cassandra, 9 pages.

* cited by examiner

FIG. 5

OPTIMIZING DATA REPLICATION ACROSS MULTIPLE DATA CENTERS

BACKGROUND

Aspects of the disclosure relate to data processing, database synchronization, and replicating data across multiple databases and data centers to ensure consistency and coherence of distributed database records. In particular, one or more aspects of the disclosure relate to optimizing data replication across multiple data centers to reduce latency, reduce resource consumption, increase throughput, and/or provide failover support.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with operating data centers that support client portals and other computing functions by optimizing data replication across data centers to reduce latency, reduce resource consumption, increase throughput, and/or provide failover support.

In accordance with one or more embodiments, a computing platform having at least one processor, a memory, and a communication interface may receive, via the communication interface, from an authentication hub computing platform, an event message corresponding to an event associated with the authentication hub computing platform. In response to receiving the event message corresponding to the event associated with the authentication hub computing platform, the computing platform may transform the event message to produce multiple transformed messages. The multiple transformed messages may include a first transformed message associated with a first topic and a second transformed message associated with a second topic different from the first topic. Subsequently, the computing platform may send, via the communication interface, to at least one messaging service computing platform associated with at least one other data center different from a data center associated with the computing platform, the multiple transformed messages.

In some embodiments, receiving the event message corresponding to the event associated with the authentication hub computing platform may include receiving information identifying a user account login event that occurred at the authentication hub computing platform. In some embodiments, transforming the event message to produce the multiple transformed messages may include transforming the event message to produce a message corresponding to a network address topic, a message corresponding to a device identifier topic, and a message corresponding to a user account identifier topic.

In some embodiments, the multiple transformed messages may be configured to be consumed by at least one listening service at the at least one other data center different from the data center associated with the computing platform. In some embodiments, the at least one listening service may be configured to detect alert parameters based on contents of at least one message queue. In addition, the at least one listening service may be configured to write information to at least one database monitored by an event detection system responsive to detecting the alert parameters.

In some embodiments, the event detection system may be configured to generate and send at least one alert based on the information written to at least one database by the at least one listening service. In some embodiments, the at least one alert may include an unauthorized user account activity alert.

In some embodiments, the computing platform may detect a failure of a first data center of the at least one other data center different from the data center associated with the computing platform. In response to detecting the failure of the first data center, the computing platform may generate one or more configuration commands for a messaging service computing platform associated with a second data center of the at least one other data center different from the data center associated with the computing platform. Additionally, the second data center may be different from the first data center. Subsequently, the computing platform may send, via the communication interface, to the messaging service computing platform associated with the second data center, the one or more configuration commands generated in response to detecting the failure of the first data center.

In some embodiments, the one or more configuration commands generated in response to detecting the failure of the first data center may direct the messaging service computing platform associated with the second data center to maintain a message queue for a topic previously associated with a message queue maintained at the first data center.

In some embodiments, after sending the one or more configuration commands to the messaging service computing platform associated with the second data center, the computing platform may receive, via the communication interface, from the authentication hub computing platform, a second event message corresponding to a second event associated with the authentication hub computing platform. In response to receiving the second event message corresponding to the second event associated with the authentication hub computing platform, the computing platform may transform the second event message to produce a second set of multiple transformed messages. Subsequently, the computing platform may send, via the communication interface, to at least the messaging service computing platform associated with the second data center, one or more messages of the second set of multiple transformed messages.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to optimizing data replication across data centers to reduce latency, reduce resource consumption, increase throughput, and/or provide failover support. In some arrangements discussed in greater detail below, instead of consuming original messages from a message system directly, a server may transform the messages and aggregate them to a message queue. As illustrated in greater detail below, this approach may reduce the overall processing effort for the same key of the message and also may provide a way to resolve transaction conflict issues.

Figure 1A:
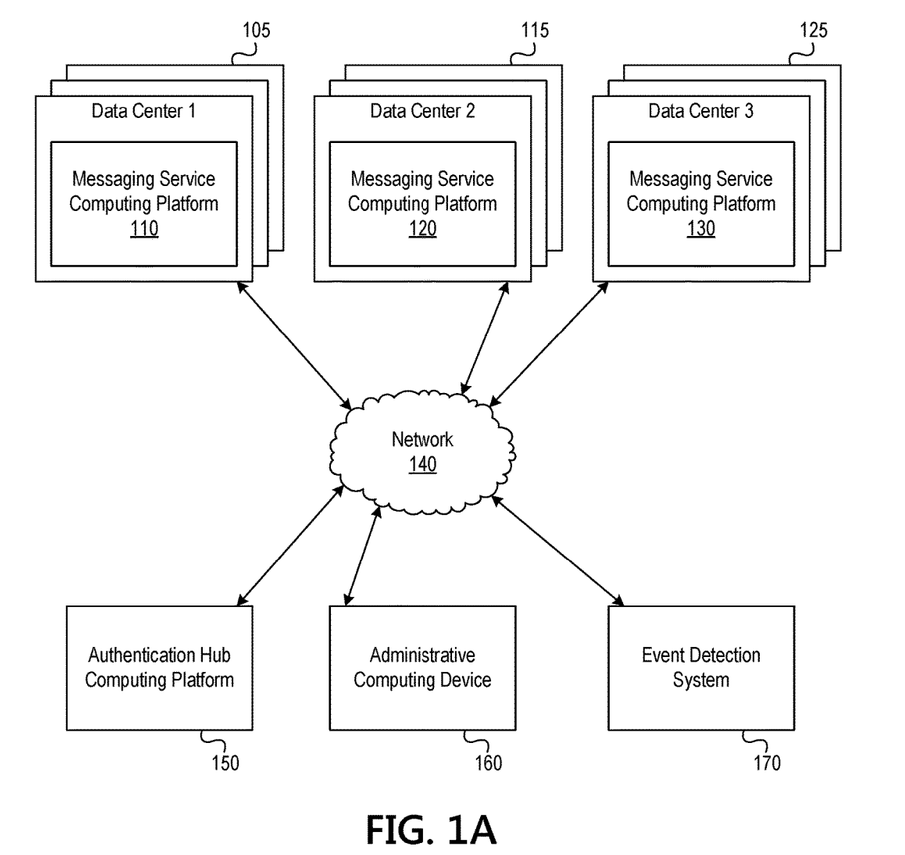
FIGS. 1A and 1B depict an illustrative computing environment for optimizing data replication across multiple data centers in accordance with one or more example embodiments.
Figure 1B:
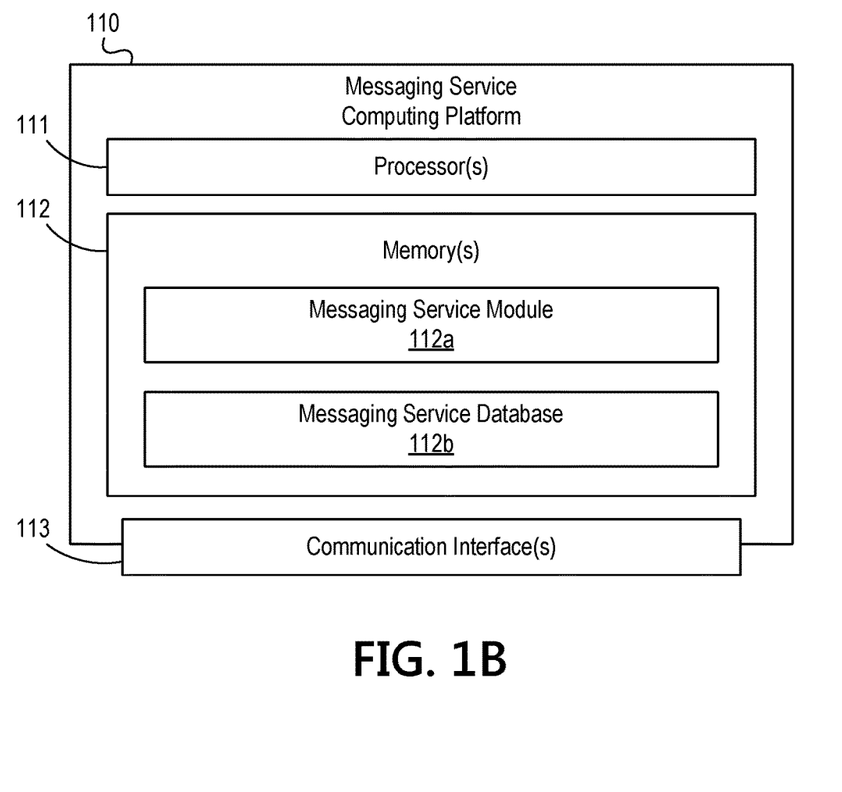

FIGS. 1A and 1B depict an illustrative computing environment for optimizing data replication across multiple data centers in accordance with one or more example embodiments. Referring to FIG. 1A, computing environment 100 may include one or more data centers and one or more computing devices, including computing devices located at or within such data centers and computing devices not located at or within such data centers. For example, computing environment 100 may include a first data center 105, a second data center 115, and a third data center 125. Data center 105 may include a messaging service computing platform 110, data center 115 may include a messaging service computing platform 120, and data center 125 may include a messaging service computing platform 130. Computing environment 100 also may include an authentication hub computing platform 150, an administrative computing device 160, and an event detection system 170.

Data center 105, data center 115, and data center 125 may be distinct and physically separate data centers that are operated by and/or otherwise associated with an organization, such as a financial institution. In addition, each of data center 105, data center 115, and data center 125 may house a plurality of server computers and various other computers, network components, and devices.

Authentication hub computing platform 150 may be configured to provide one or more portal interfaces to one or more client devices and/or may be configured to authenticate one or more client devices and/or users of such devices to such portal interfaces. For example, authentication hub computing platform 150 may be configured to provide a customer portal, such as an online banking portal, to one or more customers of an organization, such as a financial institution, who may use one or more client computing devices to access the portal and/or who may be authenticated to one or more portal user accounts by authentication hub computing platform 150 using various authentication techniques. In some instances, in addition to being configured to provide an online banking portal associated with a financial institution to one or more customers of the financial institution and/or their associated computing devices, authentication hub computing platform 150 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

In some instances, one or more of data center 105, data center 115, and data center 125 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating data center 105, data center 115, and data center 125), to connect one or more customers of the organization with one or more customer service representatives of the organization via one or more telephone support sessions, chat support sessions, and/or other client support sessions.

Administrative computing device 160 may be configured to provide one or more interfaces that allow for configuration and management of one or more other computing devices and/or computer systems included in computing environment 100. Event detection system 170 may be configured to detect events occurring within computing environment 100, generate one or more alerts based on detecting such events, and send such alerts to one or more recipient devices. For example, event detection system 170 may be configured to detect attempts at unauthorized access to one or more user accounts for a client portal associated with authentication hub computing platform 150 and subsequently generate and send one or more alerts to one or more recipient devices, such as administrative computing device 160.

In one or more arrangements, authentication hub computing platform 150, administrative computing device 160, and event detection system 170 may be any type of computing device capable of receiving a user interface, receiving input via the user interface, and communicating the received input to one or more other computing devices. For example, authentication hub computing platform 150, administrative computing device 160, and event detection system 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of authentication hub computing platform 150, administrative computing device 160, and event detection system 170 may, in some instances, be special-purpose computing devices configured to perform specific functions.

Computing environment 100 also may include one or more computing platforms. For example, computing environment 100 may include messaging service computing platform 110, messaging service computing platform 120, and messaging service computing platform 130. As illustrated in greater detail below, messaging service computing platform 110, messaging service computing platform 120, and messaging service computing platform 130 each may include one or more computing devices configured to perform one or more of the functions described herein. For example, messaging service computing platform 110, messaging service computing platform 120, and messaging service computing platform 130 each may include one or more computers (e.g., laptop computers, desktop computers, servers, server blades, or the like). Computing environment 100 also may include one or more networks, which may interconnect one or more of data center 105, messaging service computing platform 110, data center 115, messaging service computing platform 120, data center 125, messaging service computing platform 130, authentication hub computing platform 150, administrative computing device 160, and event detection system 170. For example, computing environment 100 may include network 140, which may include one or more public networks, one or more private networks, and/or one or more sub-networks (e.g., local area networks (LANs), wide area networks (WANs), or the like).

Referring to FIG. 1B, messaging service computing platform 110 may include one or more processors 111, memory 112, and communication interface 113. A data bus may interconnect processor 111, memory 112, and communication interface 113. Communication interface 113 may be a network interface configured to support communication between messaging service computing platform 110 and one or more networks (e.g., network 140 or the like). Memory 112 may include one or more program modules having instructions that when executed by processor 111 cause messaging service computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of messaging service computing platform 110 and/or by different computing devices that may form and/or otherwise make up messaging service computing platform 110. For example, memory 112 may have, store, and/or include a messaging service module 112a and a messaging service database 112b. Messaging service module 112a may have instructions that direct and/or cause messaging service computing platform 110 to optimize data replication across multiple data centers, as discussed in greater detail below. Messaging service database 112b may store information used by messaging service module 112a and/or messaging service computing platform 110 in optimizing data replication across multiple data centers and/or in performing other functions. In addition, messaging service computing platform 120 and messaging service computing platform 130 may, in one or more arrangements, include one or more components similar to those discussed above with respect to messaging service computing platform 110 and/or may otherwise be configured like messaging service computing platform 110, although messaging service computing platform 120 and messaging service computing platform 130 may operate at different data centers than messaging service computing platform 110.

Figure 2A:
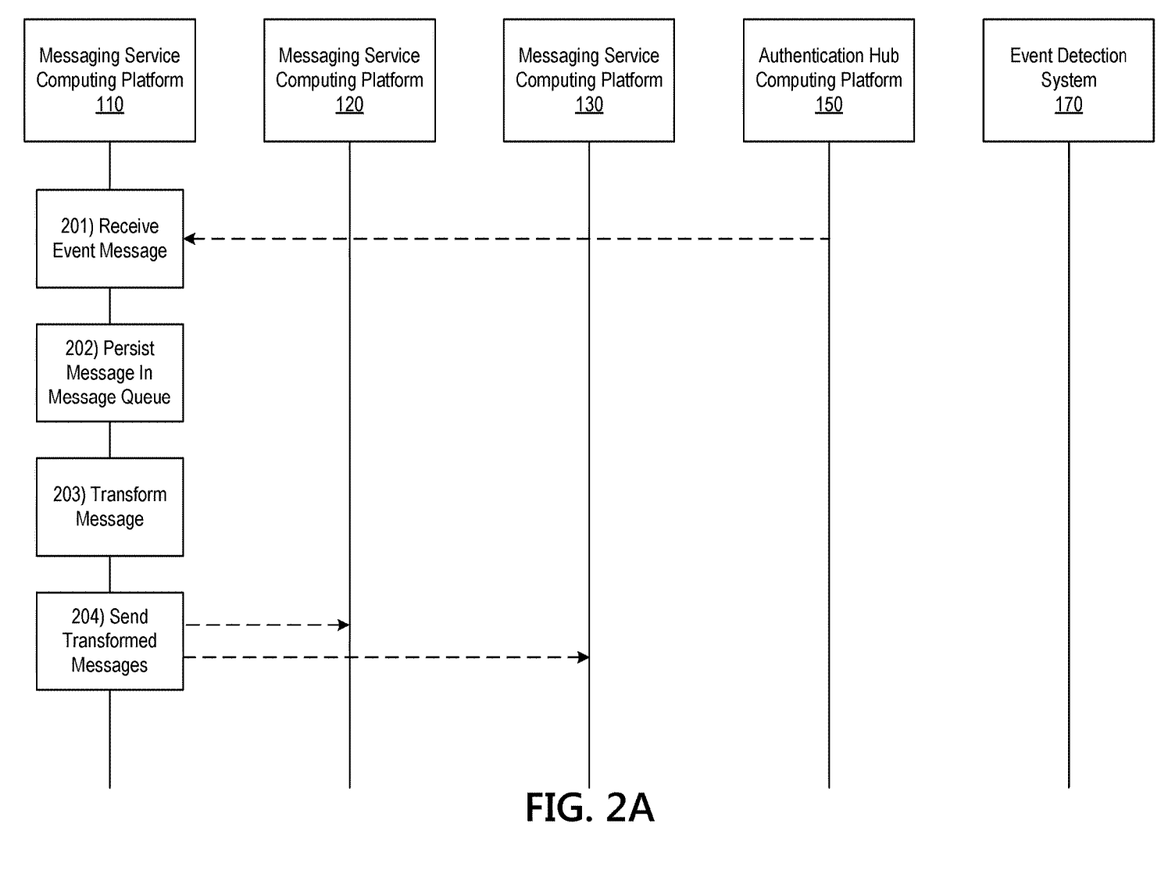
FIGS. 2A, 2B, and 2C depict an illustrative event sequence for optimizing data replication across multiple data centers in accordance with one or more example embodiments.
Figure 2B:
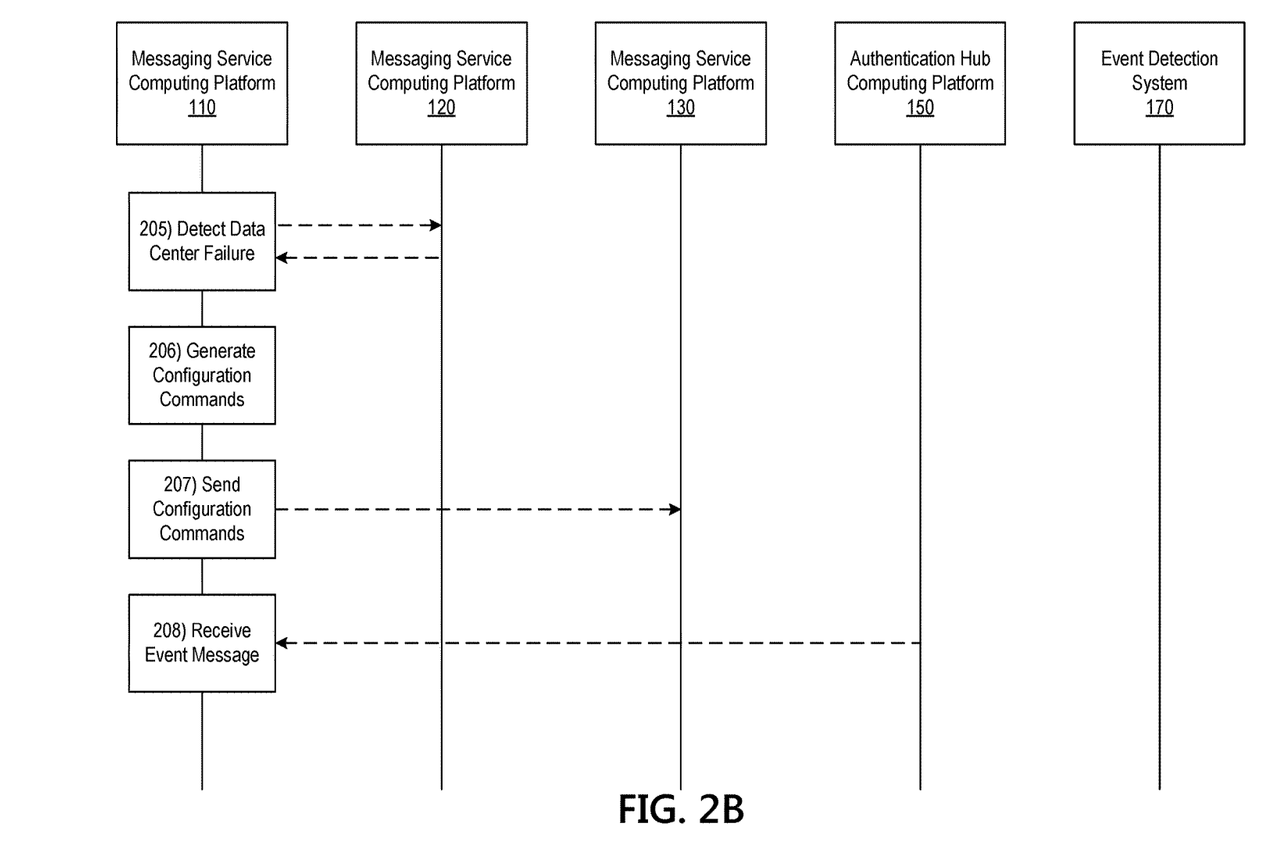
Figure 2C:
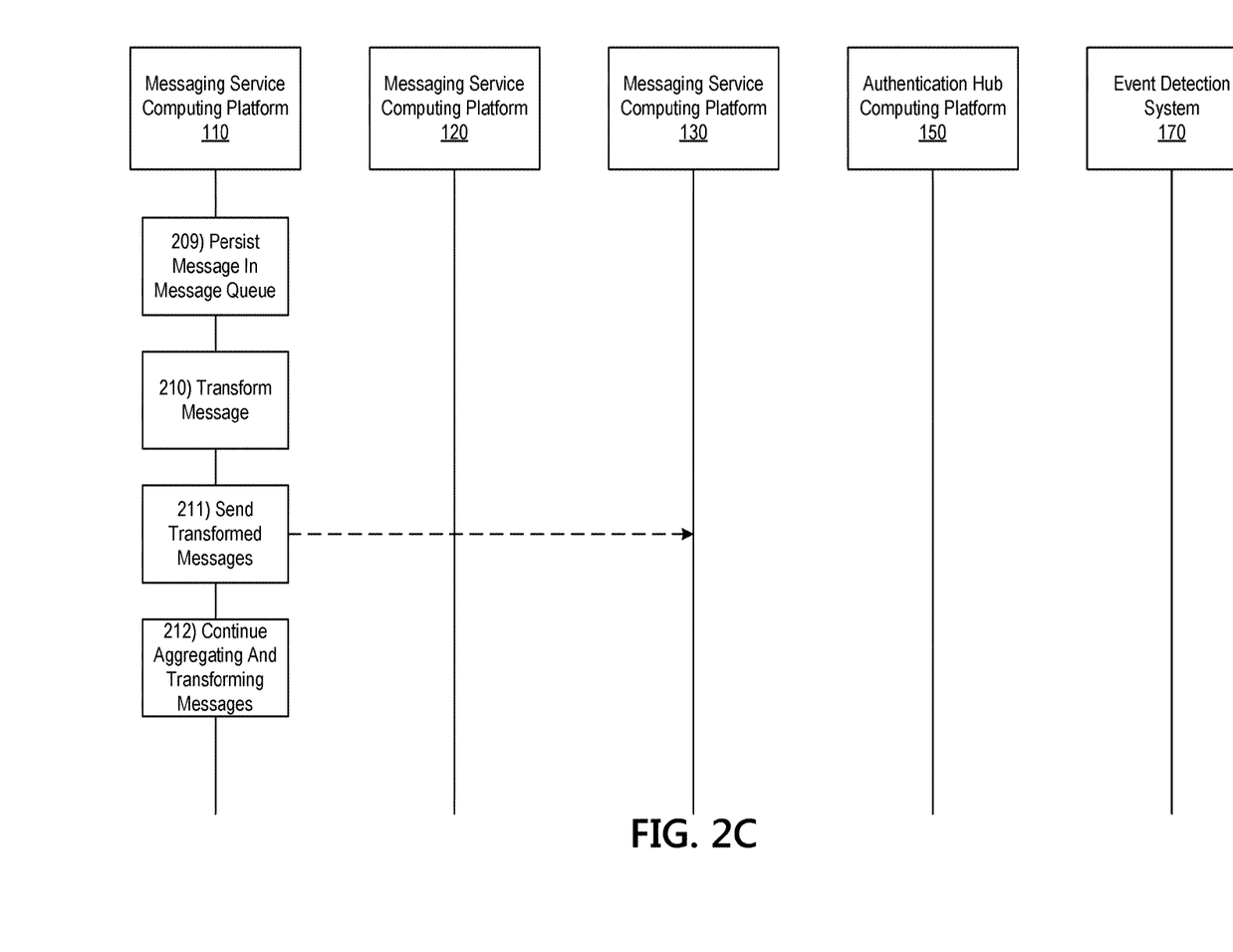

FIGS. 2A, 2B, and 2C depict an illustrative event sequence for optimizing data replication across multiple data centers in accordance with one or more example embodiments. Referring to FIG. 2A, at step 201, messaging service computing platform 110 may receive an event message from authentication hub computing platform 150 (e.g., based on a particular event occurring at authentication hub computing platform 150, such as a login event). For example, at step 201, messaging service computing platform 110 may receive, via the communication interface (e.g., communication interface 113), from an authentication hub computing platform (e.g., authentication hub computing platform 150), an event message corresponding to an event associated with the authentication hub computing platform (e.g., authentication hub computing platform 150). The event message received by messaging service computing platform 110 may, for instance, include information defining and/or otherwise identifying the event that occurred at authentication hub computing platform 150, including different information components that may correspond to and/or otherwise be associated with different message topics, as discussed in greater detail below.

In some embodiments, receiving the event message corresponding to the event associated with the authentication hub computing platform may include receiving information identifying a user account login event that occurred at the authentication hub computing platform. For example, in receiving the event message corresponding to the event associated with the authentication hub computing platform (e.g., authentication hub computing platform 150) at step 201, messaging service computing platform 110 may receive information identifying a user account login event that occurred at the authentication hub computing platform (e.g., authentication hub computing platform 150). In some instances, the information identifying the user account login event that occurred at authentication hub computing platform 150 may, for instance, include information identifying whether a login attempt corresponding to the user account login event was successful or not, information identifying an IP address or other network address of the device that initiated the login attempt, information identifying a device identifier of the device that initiated the login attempt, information identifying a username, customer identifier, or other user account identifier used in the login attempt, and/or other information.

At step 202, messaging service computing platform 110 may persist the event message in a message queue. For example, messaging service computing platform 110 may maintain one or more messages queues, include one or more message queues for messages received by messaging service computing platform 110 from authentication hub computing platform 150 as well as one or more topic-specific messages queues for messages received from messaging service computing platform 120, messaging service computing platform 130, and/or the like. In persisting the event message (which may, e.g., have been received from authentication hub computing platform 150 at step 201), messaging service computing platform 110 may, for instance, insert the event message into a queue maintained by messaging service computing platform 110 where the event message may be detected, received, and/or read by one or more streaming listener services executed by one or more computing devices operated at the same data center where messaging service computing platform 110 is operated (e.g., data center 105).

At step 203, messaging service computing platform 110 may transform the event message (e.g., to produce multiple transformed messages for different topics, so that different topic-specific messages may be sent to various topic-specific messages queues maintained by messaging service computing platform 110, messaging service computing platform 120, and/or messaging service computing platform 130, as discussed in greater detail below). For example, at step 203, in response to receiving the event message corresponding to the event associated with the authentication hub computing platform (e.g., authentication hub computing platform 150), messaging service computing platform 110 may transform the event message to produce multiple transformed messages. In particular, at step 203, messaging service computing platform 110 may, for instance, produce multiple transformed messages that include at least a first transformed message associated with a first topic and a second transformed message associated with a second topic different from the first topic. For example, the original event message that messaging service computing platform 110 may transform at step 203 may include information associated with a plurality of different topics and/or sub-topics, and each of the transformed messages that messaging service computing platform 110 may produce at step 203 may include information that is specific to, or otherwise be associated with, a single topic or sub-topic of the plurality of different topics and/or sub-topics.

In some embodiments, transforming the event message to produce the multiple transformed messages may include transforming the event message to produce a message corresponding to a network address topic, a message corresponding to a device identifier topic, and a message corresponding to a user account identifier topic. For example, in transforming the event message to produce the multiple transformed messages (e.g., at step 203), messaging service computing platform 110 may transform the event message to produce a message corresponding to a network address topic, a message corresponding to a device identifier topic, and a message corresponding to a user account identifier topic. For instance, the event message originally received by messaging service computing platform 110 at step 201 may include information associated with each of the network address topic (e.g., information identifying an IP address or other network address of the device that initiated the login attempt corresponding to the event message), the device identifier topic (e.g., information identifying a device identifier of the device that initiated the login attempt corresponding to the event message), and the user identifier topic (e.g., information identifying a username, customer identifier, or other user account identifier used in the login attempt corresponding to the event message). And, in transforming this event message, messaging service computing platform 110 may produce a single first message that only includes the information associated with the network address topic (e.g., information identifying an IP address or other network address of the device that initiated the login attempt corresponding to the event message), another second message that only includes the information associated with the device identifier topic (e.g., information identifying a device identifier of the device that initiated the login attempt corresponding to the event message), and another third message that only the includes information associated with the user identifier topic (e.g., information identifying a username, customer identifier, or other user account identifier used in the login attempt corresponding to the event message).

At step 204, messaging service computing platform 110 may send the transformed messages to different data centers (e.g., data center 115, data center 125) based on the particular topic of each of the transformed messages. For example, at step 204, messaging service computing platform 110 may send, via the communication interface (e.g., communication interface 113), to at least one messaging service computing platform (e.g., messaging service computing platform 120, messaging service computing platform 130) associated with at least one other data center (e.g., data center 115, data center 125) different from a data center (e.g., data center 105) associated with the computing platform (e.g., messaging service computing platform 110), the multiple transformed messages. For example, each data center (e.g., data center 105, data center 115, data center 125) may be assigned (e.g., by messaging service computing platform 110 or administrative computing device 160) to maintain one or more messages queues for one or more specific topics. For instance, messaging service computing platform 110 at data center 105 may maintain a first message queue for messages associated with the network address topic, messaging service computing platform 120 at data center 115 may maintain a second message queue for messages associated with the device identifier topic, and messaging service computing platform 130 at data center 125 may maintain a third message queue for messages associated with the user identifier topic. In addition, in sending the transformed messages to various data centers at step 204, messaging service computing platform 110 may send the transformed messages associated with the network address topic to its own message queue (e.g., maintained by messaging service computing platform 110 at data center 105), messaging service computing platform 110 may send the transformed messages associated with the device identifier topic to messaging service computing platform 120 at data center 125 (e.g., to be added to a message queue maintained by messaging service computing platform 120 at data center 125), and messaging service computing platform 110 may send the transformed messages associated with the user identifier topic to messaging service computing platform 130 at data center 125 (e.g., to be added to a message queue maintained by messaging service computing platform 130 at data center 125).

In some embodiments, the multiple transformed messages may be configured to be consumed by at least one listening service at the at least one other data center different from the data center associated with the computing platform. For example, the multiple transformed messages (which may, e.g., be produced by messaging service computing platform 110 at step 203 and sent by messaging service computing platform 110 to various message queues at various data centers at step 204) may be configured to be consumed by at least one listening service at the at least one other data center (e.g., data center 115, data center 125) different from the data center (e.g., data center 105) associated with the computing platform (e.g., messaging service computing platform 110). For instance, a listening service executed at each data center (e.g., data center 105, data center 115, data center 125) may consume messages in the message queue(s) maintained at the listening service's corresponding data center to detect certain conditions, write information to one or more databases, generate and/or send one or more notifications, and/or otherwise process the messages and/or other information associated with the message queue(s) maintained at each data center (e.g., data center 105, data center 115, data center 125).

In some embodiments, the at least one listening service may be configured to detect alert parameters based on contents of at least one message queue, and the at least one listening service may be further configured to write information to at least one database monitored by an event detection system responsive to detecting the alert parameters. For example, the at least one listening service (which may, e.g., be executed at data center 105, data center 115, and/or data center 125) may be configured to detect alert parameters based on contents of at least one message queue (which may, e.g., be maintained by messaging service computing platform 110 at data center 105, messaging service computing platform 120 at data center 115, and/or messaging service computing platform 130 at data center 125). In addition, the at least one listening service (which may, e.g., be executed at data center 105, data center 115, and/or data center 125) may be configured to write information to at least one database monitored by an event detection system (e.g., event detection system 170) responsive to detecting the alert parameters.

In some embodiments, the event detection system may be configured to generate and send at least one alert based on the information written to at least one database by the at least one listening service. For example, the event detection system (e.g., event detection system 170) may be configured to generate and send at least one alert (e.g., to authentication hub computing platform 150, administrative computing device 160, and/or one or more other systems and/or devices) based on the information written to at least one database by the at least one listening service (which may, e.g., be executed at data center 105, data center 115, and/or data center 125). In this way, the listening service (which may, e.g., be executed at data center 105, data center 115, and/or data center 125) writing information to one or more databases may cause another system, such as event detection system 170, to generate and send one or more alerts.

In some embodiments, the at least one alert may include an unauthorized user account activity alert. For example, the at least one alert (which may, e.g., be generated and sent by event detection system 170 based on the information written to at least one database by the at least one listening service) may include an unauthorized user account activity alert. For instance, the alert parameters detected by the at least one listening service (which may, e.g., be executed at data center 105, data center 115, and/or data center 125) may define conditions that trigger an unauthorized user account activity alert, and the at least one listening service (which may, e.g., be executed at data center 105, data center 115, and/or data center 125) and/or event detection system 170 may detect such conditions based on the alert parameters being met by the current contents of a particular message queue and may generate and send the unauthorized user account activity alert accordingly.

Figure 3:
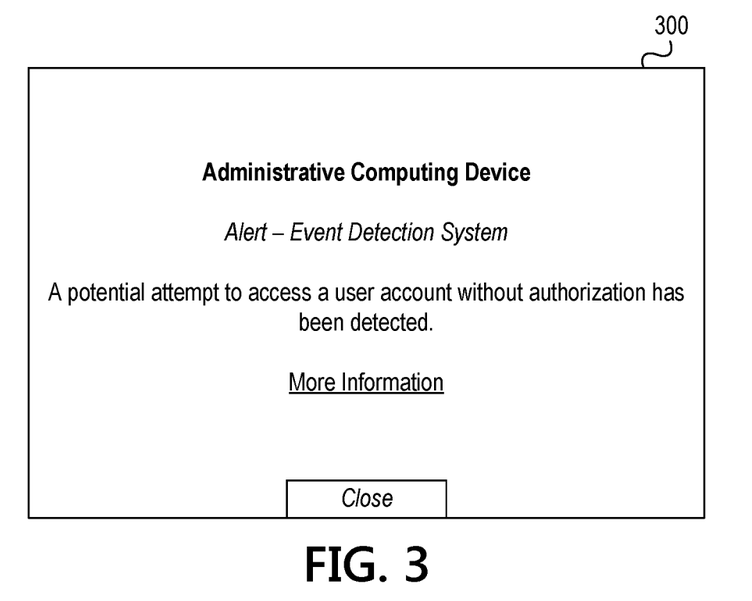
FIGS. 3 and 4 depict example graphical user interfaces for optimizing data replication across multiple data centers in accordance with one or more example embodiments.

In some instances, such an unauthorized user account activity alert may direct and/or otherwise cause a computing device, such as administrative computing device 160, to display and/or otherwise present a graphical user interface similar to graphical user interface 300, which is illustrated in FIG. 3. As seen in FIG. 3, graphical user interface 300 may include information notifying a user of administrative computing device 160 that an alert has been received by administrative computing device 160 from event detection system 170, as well as information associated with the contents of the alert (e.g., "A potential attempt to access a user account without authorization has been detected. More Information").

Figure 4:
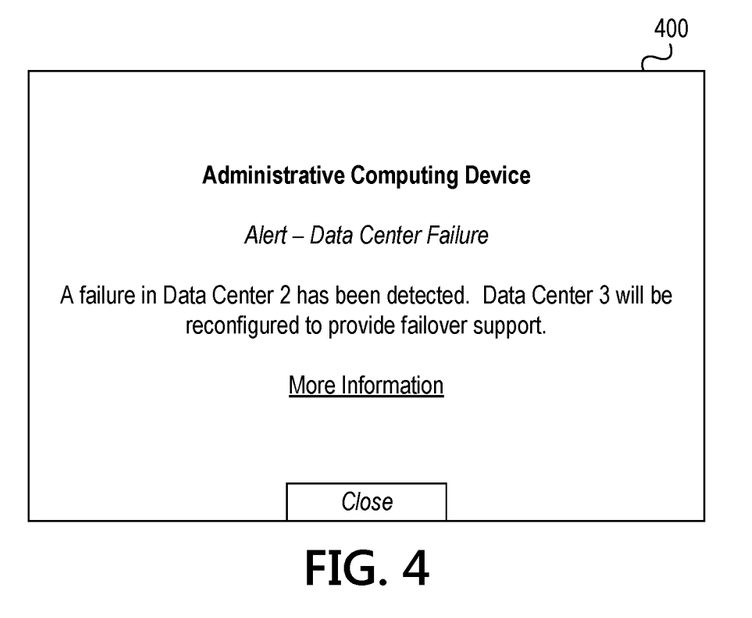

Referring to FIG. 2B, at step 205, messaging service computing platform 110 may detect that one of the other data centers (e.g., data center 115) has failed. For example, at step 205, messaging service computing platform 110 may detect a failure of a first data center (e.g., data center 115) of the at least one other data center (e.g., data center 115, data center 125) different from the data center (e.g., data center 105) associated with the computing platform (e.g., messaging service computing platform 110). In some instances, in response to detecting the failure of first data center (e.g., data center 115), messaging service computing platform 110 may generate and send a notification to one or more other systems or devices, such as administrative computing device 160, which may cause such systems or devices (e.g., administrative computing device 160) to display and/or otherwise present a graphical user interface similar to graphical user interface 400, which is illustrated in FIG. 4. As seen in FIG. 4, graphical user interface 400 may include information notifying a user of administrative computing device 160 that a data center failure has been detected by messaging service computing platform 110, as well as information associated with the contents of notification (e.g., "A failure in Data Center 2 has been detected. Data Center 3 will be reconfigured to provide failover support").

At step 206, messaging service computing platform 110 may generate one or more configuration commands (e.g., to update the configuration of other message queues maintained at other data centers). For example, at step 206, in response to detecting the failure of the first data center (e.g., data center 115), messaging service computing platform 110 may generate one or more configuration commands for a messaging service computing platform (e.g., messaging service computing platform 130) associated with a second data center (e.g., data center 125) of the at least one other data center (e.g., data center 115, data center 125) different from the data center (e.g., data center 105) associated with the computing platform (e.g., messaging service computing platform 110), the second data center (e.g., data center 125) being different from the first data center (e.g., data center 115).

At step 207, messaging service computing platform 110 may send the configuration commands to the other data centers. For example, at step 207, messaging service computing platform 110 may send, via the communication interface (e.g., communication interface 113), to the messaging service computing platform (e.g., messaging service computing platform 130) associated with the second data center (e.g., data center 125), the one or more configuration commands generated in response to detecting the failure of the first data center (e.g., data center 115).

In some embodiments, the one or more configuration commands generated in response to detecting the failure of the first data center may direct the messaging service computing platform associated with the second data center to maintain a message queue for a topic previously associated with a message queue maintained at the first data center. For example, the one or more configuration commands generated by messaging service computing platform 110 in response to detecting the failure of the first data center (e.g., data center 115) may direct the messaging service computing platform (e.g., messaging service computing platform 130) associated with the second data center (e.g., data center 125) to maintain a message queue for a topic previously associated with a message queue maintained at the first data center (e.g., data center 115). In this way, messaging service computing platform 110 may dynamically provide failover support for topic-specific message queues in instances in which a data center that is maintaining a topic-specific message queue fails for some reason, such as because of a loss of network connectivity, system crash or restart, and/or the like.

At step 208, messaging service computing platform 110 may receive a second event message from authentication hub computing platform 150. For example, at step 208, after sending the one or more configuration commands to the messaging service computing platform (e.g., messaging service computing platform 130) associated with the second data center (e.g., data center 125), messaging service computing platform 110 may receive, via the communication interface (e.g., communication interface 113), from the authentication hub computing platform (e.g., authentication hub computing platform 150), a second event message corresponding to a second event associated with the authentication hub computing platform (e.g., authentication hub computing platform 150). The second event associated with the authentication hub computing platform (e.g., authentication hub computing platform 150) may, for instance, be a second login attempt to the same user account or a different user account as the first login attempt that triggered the first event message discussed in the examples above.

Referring to FIG. 2C, at step 209, messaging service computing platform 110 may persist the second event message in a message queue (e.g., similar to how messaging service computing platform 110 may persist the first event message discussed in the examples above). At step 210, messaging service computing platform 110 may transform the second event message (e.g., similar to how messaging service computing platform 110 may transform the first event message discussed in the examples above). For example, at step 210, in response to receiving the second event message corresponding to the second event associated with the authentication hub computing platform (e.g., authentication hub computing platform 150), messaging service computing platform 110 may transform the second event message to produce a second set of multiple transformed messages.

At step 211, messaging service computing platform 110 may send one or more transformed messages (which may, e.g., be produced by messaging service computing platform 110 based on the second event message) to one or more different data centers based on the new message queue configuration (which may, e.g., have been implemented by and/or result from the configuration commands generated by messaging service computing platform 110 at step 206 and/or sent by messaging service computing platform 110 at step 207). For example, at step 211, messaging service computing platform 110 may send, via the communication interface (e.g., communication interface 113), to at least the messaging service computing platform (e.g., messaging service computing platform 130) associated with the second data center (e.g., data center 125), one or more messages of the second set of multiple transformed messages.

At step 212, messaging service computing platform 110 may continue aggregating and transforming messages. For example, messaging service computing platform 110 may continue receiving event messages from authentication hub computing platform 150 and/or other systems and/or devices, may transform such messages similar to how messaging service computing platform 110 may transform the messages discussed in the examples above, and may send various messages, including topic-specific messages produced by messaging service computing platform 110 based on transforming received messages, to other data centers (e.g., data center 125) based on the current message queue configuration.

Figure 5:
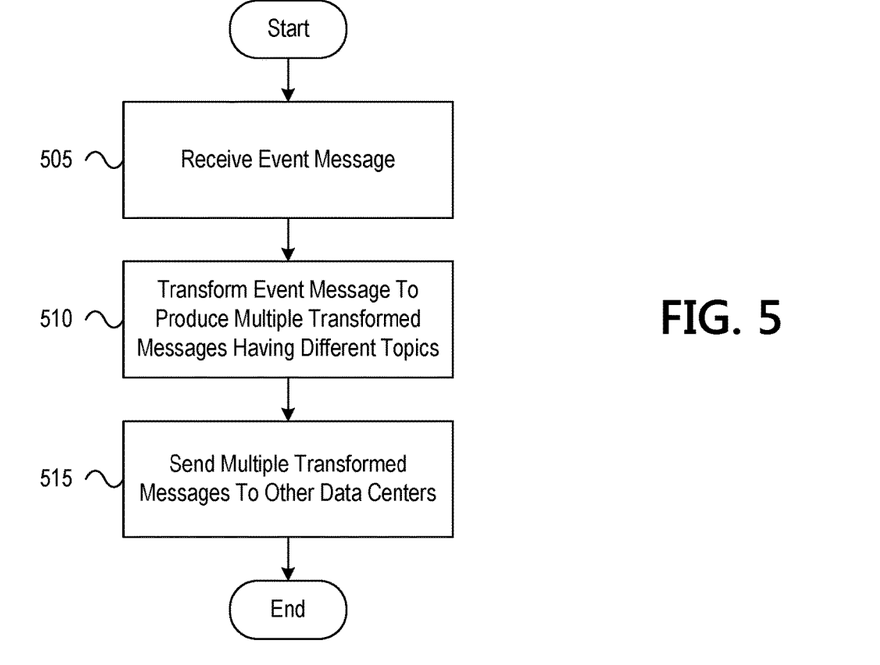
FIG. 5 depicts an illustrative method for optimizing data replication across multiple data centers in accordance with one or more example embodiments.

FIG. 5 depicts an illustrative method for optimizing data replication across multiple data centers in accordance with one or more example embodiments. Referring to FIG. 5, at step 505, a computing platform having at least one processor, a communication interface, and memory may receive, via the communication interface, from an authentication hub computing platform, an event message corresponding to an event associated with the authentication hub computing platform. At step 510, in response to receiving the event message corresponding to the event associated with the authentication hub computing platform, the computing platform may transform the event message to produce multiple transformed messages, and the multiple transformed messages may include a first transformed message associated with a first topic and a second transformed message associated with a second topic different from the first topic. At step 515, the computing platform may send, via the communication interface, to at least one messaging service computing platform associated with at least one other data center different from a data center associated with the computing platform, the multiple transformed messages.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from an authentication hub computing platform, an event message corresponding to an event associated with the authentication hub computing platform;
   in response to receiving the event message corresponding to the event associated with the authentication hub computing platform, transform the event message to produce multiple transformed messages, the multiple transformed messages comprising a first transformed message associated with a first topic and a second transformed message associated with a second topic different from the first topic;
   send, via the communication interface, to at least one messaging service computing platform associated with at least one other data center different from a data center associated with the computing platform, the multiple transformed messages;
   detect a failure of a first data center of the at least one other data center different from the data center associated with the computing platform;
   in response to detecting the failure of the first data center, generate one or more configuration commands for a messaging service computing platform associated with a second data center of the at least one other data center different from the data center associated with the computing platform, the second data center being different from the first data center; and
   send, via the communication interface, to the messaging service computing platform associated with the second data center, the one or more configuration commands generated in response to detecting the failure of the first data center, wherein the one or more configuration commands generated in response to detecting the failure of the first data center direct the messaging service computing platform associated with the second data center to maintain a message queue for a topic previously associated with a message queue maintained at the first data center.

2. The computing platform of claim 1, wherein receiving the event message corresponding to the event associated with the authentication hub computing platform comprises receiving information identifying a user account login event that occurred at the authentication hub computing platform.

3. The computing platform of claim 2, wherein transforming the event message to produce the multiple transformed messages comprises transforming the event message to produce a message corresponding to a network address topic, a message corresponding to a device identifier topic, and a message corresponding to a user account identifier topic.

4. The computing platform of claim 2, wherein the multiple transformed messages are configured to be consumed by at least one listening service at the at least one other data center different from the data center associated with the computing platform.

5. The computing platform of claim 4, wherein the at least one listening service is configured to detect alert parameters based on contents of at least one message queue, and wherein the at least one listening service is configured to write information to at least one database monitored by an event detection system responsive to detecting the alert parameters.

6. The computing platform of claim 5, wherein the event detection system is configured to generate and send at least one alert based on the information written to the at least one database by the at least one listening service.

7. The computing platform of claim 6, wherein the at least one alert comprises an unauthorized user account activity alert.

8. The computing platform of claim 1, wherein the memory stores additional computer-readable instructions that, when executed by the at least one processor, cause the computing platform to:
   after sending the one or more configuration commands to the messaging service computing platform associated with the second data center:
   receive, via the communication interface, from the authentication hub computing platform, a second event message corresponding to a second event associated with the authentication hub computing platform;
   in response to receiving the second event message corresponding to the second event associated with the authentication hub computing platform, transform the second event message to produce a second set of multiple transformed messages; and
   send, via the communication interface, to at least the messaging service computing platform associated with the second data center, one or more messages of the second set of multiple transformed messages.

9. A method, comprising:
   at a computing platform comprising at least one processor, memory, and a communication interface:
   receiving, by the at least one processor, via the communication interface, from an authentication hub computing platform, an event message corresponding to an event associated with the authentication hub computing platform;
   in response to receiving the event message corresponding to the event associated with the authentication hub computing platform, transforming, by the at least one processor, the event message to produce multiple transformed messages, the multiple transformed messages comprising a first transformed message associated with a first topic and a second transformed message associated with a second topic different from the first topic;

sending, by the at least one processor, via the communication interface, to at least one messaging service computing platform associated with at least one other data center different from a data center associated with the computing platform, the multiple transformed messages;

detecting, by the at least one processor, a failure of a first data center of the at least one other data center different from the data center associated with the computing platform;

in response to detecting the failure of the first data center, generating, by the at least one processor, one or more configuration commands for a messaging service computing platform associated with a second data center of the at least one other data center different from the data center associated with the computing platform, the second data center being different from the first data center; and sending, by the at least one processor, via the communication interface, to the messaging service computing platform associated with the second data center, the one or more configuration commands generated in response to detecting the failure of the first data center, wherein the one or more configuration commands generated in response to detecting the failure of the first data center direct the messaging service computing platform associated with the second data center to maintain a message queue for a topic previously associated with a message queue maintained at the first data center.

10. The method of claim 9, wherein receiving the event message corresponding to the event associated with the authentication hub computing platform comprises receiving information identifying a user account login event that occurred at the authentication hub computing platform.

11. The method of claim 10, wherein transforming the event message to produce the multiple transformed messages comprises transforming the event message to produce a message corresponding to a network address topic, a message corresponding to a device identifier topic, and a message corresponding to a user account identifier topic.

12. The method of claim 10, wherein the multiple transformed messages are configured to be consumed by at least one listening service at the at least one other data center different from the data center associated with the computing platform.

13. The method of claim 12, wherein the at least one listening service is configured to detect alert parameters based on contents of at least one message queue, and wherein the at least one listening service is configured to write information to at least one database monitored by an event detection system responsive to detecting the alert parameters.

14. The method of claim 13, wherein the event detection system is configured to generate and send at least one alert based on the information written to the at least one database by the at least one listening service.

15. The method of claim 14, wherein the at least one alert comprises an unauthorized user account activity alert.

16. The method of claim 9, comprising:
after sending the one or more configuration commands to the messaging service computing platform associated with the second data center:
receiving, by the at least one processor, via the communication interface, from the authentication hub computing platform, a second event message corresponding to a second event associated with the authentication hub computing platform;
in response to receiving the second event message corresponding to the second event associated with the authentication hub computing platform, transforming, by the at least one processor, the second event message to produce a second set of multiple transformed messages; and
sending, by the at least one processor, via the communication interface, to at least the messaging service computing platform associated with the second data center, one or more messages of the second set of multiple transformed messages.

17. One or more non-transitory computer-readable media storing instructions that, when executed by a computing platform comprising at least one processor, memory, and a communication interface, cause the computing platform to:
receive, via the communication interface, from an authentication hub computing platform, an event message corresponding to an event associated with the authentication hub computing platform;
in response to receiving the event message corresponding to the event associated with the authentication hub computing platform, transform the event message to produce multiple transformed messages, the multiple transformed messages comprising a first transformed message associated with a first topic and a second transformed message associated with a second topic different from the first topic;
send, via the communication interface, to at least one messaging service computing platform associated with at least one other data center different from a data center associated with the computing platform, the multiple transformed messages;
detect a failure of a first data center of the at least one other data center different from the data center associated with the computing platform;
in response to detecting the failure of the first data center, generate one or more configuration commands for a messaging service computing platform associated with a second data center of the at least one other data center different from the data center associated with the computing platform, the second data center being different from the first data center; and
send, via the communication interface, to the messaging service computing platform associated with the second data center, the one or more configuration commands generated in response to detecting the failure of the first data center, wherein the one or more configuration commands generated in response to detecting the failure of the first data center direct the messaging service computing platform associated with the second data center to maintain a message queue for a topic previously associated with a message queue maintained at the first data center.

* * * * *